W. H. GRINDALL.
POWER TRANSMISSION.
APPLICATION FILED FEB. 26, 1916.

1,213,354.

Patented Jan. 23, 1917.
2 SHEETS—SHEET 1.

Witness
Daniel Webster

Inventor
William H. Grindall
By Francis T. Chambers
his Attorney

W. H. GRINDALL.
POWER TRANSMISSION.
APPLICATION FILED FEB. 26, 1916.
1,213,354.
Patented Jan. 23, 1917.
2 SHEETS—SHEET 2.
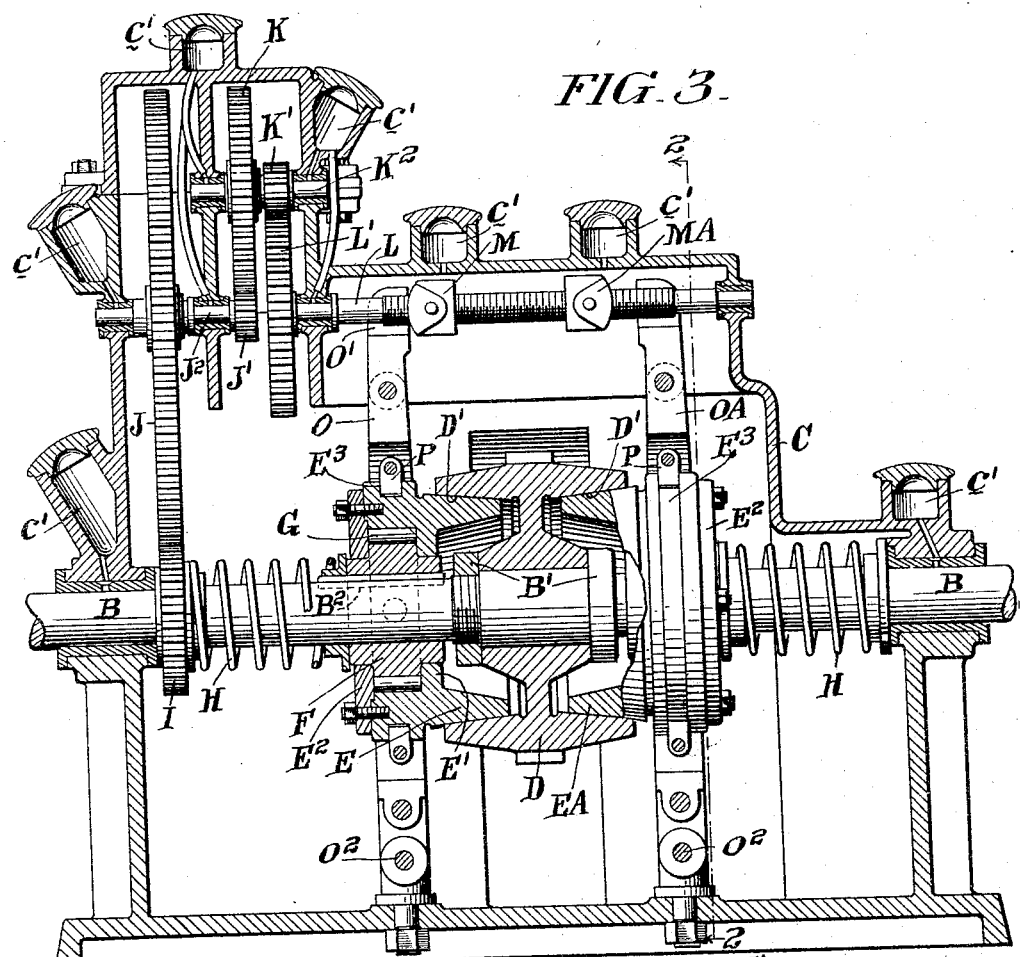
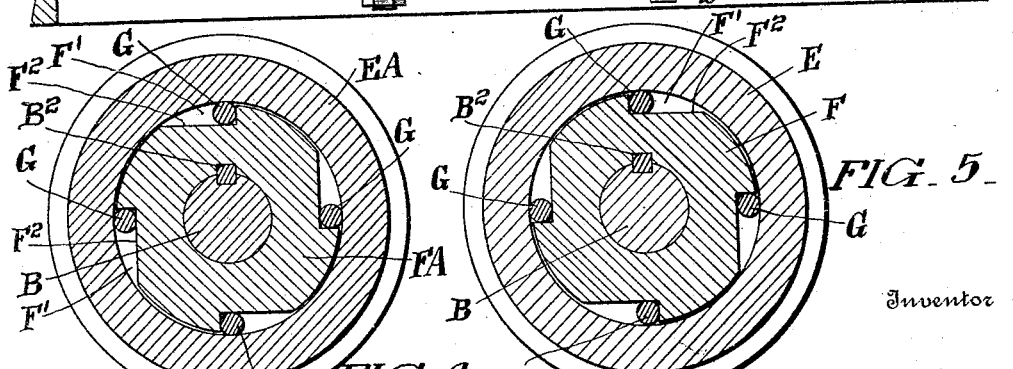

UNITED STATES PATENT OFFICE.

WILLIAM H. GRINDALL, OF ALTOONA, PENNSYLVANIA.

POWER TRANSMISSION.

1,213,354.  Specification of Letters Patent.  Patented Jan. 23, 1917.

Application filed February 26, 1916. Serial No. 80,583.

*To all whom it may concern:*

Be it known that I, WILLIAM H. GRINDALL, a citizen of the United States of America, and a resident of Altoona, in the county of Blair and State of Pennsylvania, have invented certain new and useful Improvements in Power Transmission, of which the following is a true and exact description, reference being had to the accompanying drawings, which form a part thereof.

My present invention is a power transmitting mechanism devised with the object of providing a simple and effective connection between a reversible rotating driving member and a driven shaft normally operating to permit the rotation of the driven shaft in either direction according to the direction of rotation of the reversible driving member, but comprising means for disconnecting the driven shaft from the driving member to thereby prevent further movement in the same direction of the driven shaft after the latter has received a predetermined angular movement in one direction or the other away from a neutral position.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Figure 1:
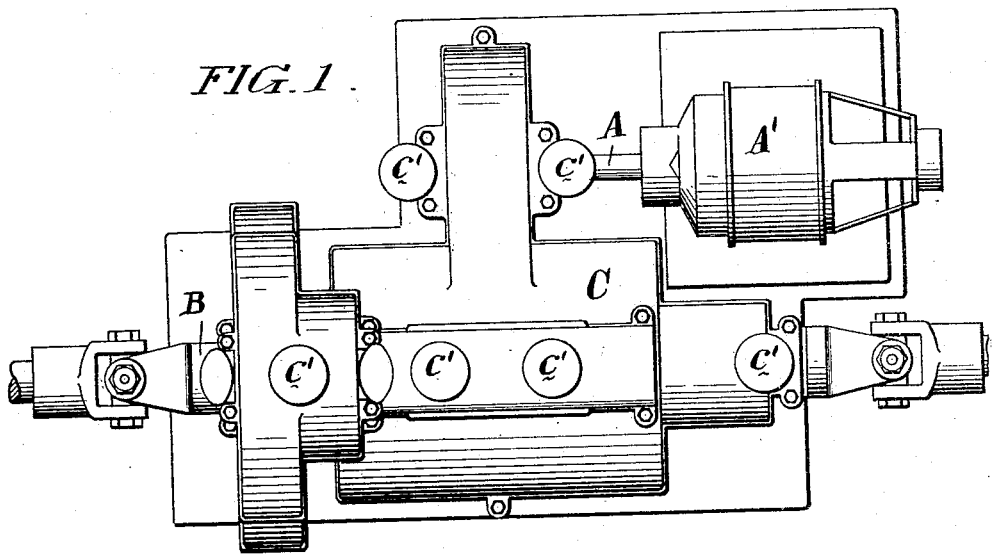
Figure 2:
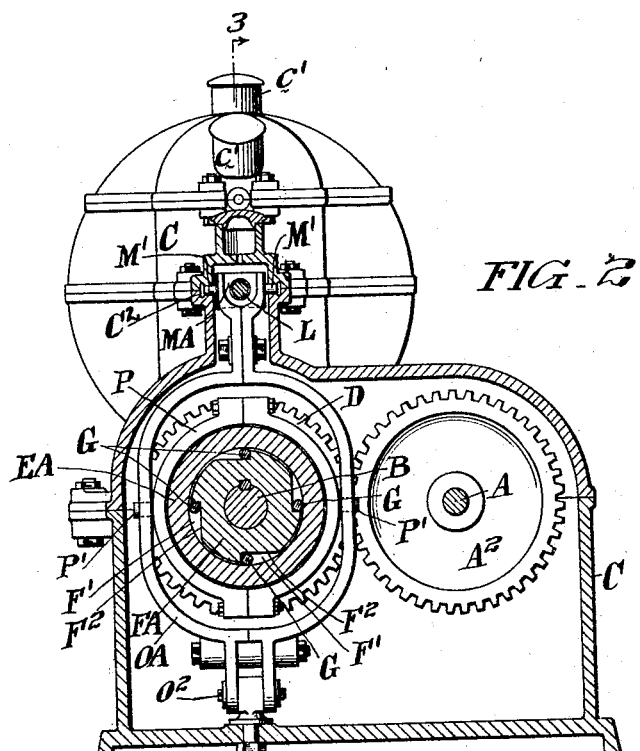

Of the drawings: Figure 1 is a plan view; Fig. 2 is an end elevation partly in section on the line 2—2 of Fig. 3; Fig. 3 is a side elevation partly in section on the line 3—3 of Fig. 2; Fig. 4 is an elevation of a part of one of the ratchet mechanisms employed; and Fig. 5 is a similar view of the corresponding part of the second ratchet mechanism.

In the power transmitting mechanism shown in the drawings, A represents a reversible driving shaft; B the driven shaft, and C the housing of the power transmitting connection between the shafts A and B. As shown, the shaft A is the armature shaft, or an extension thereof of the reversible electric motor A′ which may be mounted on the same base or support as the housing C. The shaft A extends through and is journaled in the walls of a projecting portion of the housing C arranged to inclose the spur gear $A^2$ secured to the shaft A within the housing. The gear $A^2$ is shown as in mesh with a spur gear member D which is mounted on and forms the driving member for the driven shaft B. Collars B′ secured to the shaft B prevent axial displacement of the gear member D. The gear member D is not directly or positively secured to the driven shaft B, but is normally held against rotation with respect thereto by means comprising friction clutch members E and EA at opposite sides of the gear D and normally held by the springs H in frictional locking engagement with the tapered internal contact surfaces D′ of the member D. The clutch member E is connected to the driven shaft B by a ratchet mechanism comprising a collar F which is surrounded by the member E and is splined on the shaft B through the key $B^2$. As shown, the member F comprises a body portion which fits between the internal flange or web portion E′ of the member E and the washer member $E^2$ bolted to the outer end of the member E. The web portion E′ and the washer $E^2$ surround, and are journaled on the hub portions of the member F. The body portion of the member F is formed with peripheral pockets F′ receiving rollers G which jam between the inclined bottom walls $F^2$ of the pockets F′ and the surrounding cylindrical wall of the member E and thus lock the member E to the driven shaft when the member E is rotated in one direction; namely, in the counter clock-wise direction as seen in Figs. 2 and 4. When the direction of rotation of the driving shaft and thereby of the member E is reversed, however, the rollers G are released thus disconnecting the members E and F, so that so far as the members E and F are concerned, the clock-wise direction of rotation of the member E may take place without a corresponding rotation of the driven shaft.

The clutch and ratchet members EA and FA may be identical with the members E and F respectively, except that the pockets F′ in the member FA are so shaped, (see Fig. 5), that with the direction of rotation of the driving shaft and gear D in which the member E is locked to the shaft B, the member EA turns freely about the member FA, while with the opposite, or clockwise, direction of rotation of the gear D, the member EA is locked to the member FA and thereby to the driven shaft B.

With the construction described it will be apparent that the driving and driven shafts are normally connected so that the driven shaft will respond instantly and directly to a rotative movement in either direction of the driving shaft. At the same time the connection is of a character to permit the ready disconnection of the driving and driven shafts to prevent an angular movement of the driven shaft in excess of a predetermined amount away from a neutral position in either direction, and mechanism is provided for automatically disconnecting the driving and driven shafts in order to prevent overtravel of the latter in either direction.

The mechanism employed for this purpose comprises a screw shaft L connected to the shaft B by a suitable speed reducing gearing. As shown, the speed reducing gear connection between the shafts B and L comprises a spur gear I secured to the shaft B, a spur gear J in mesh with the gear I and secured to the countershaft $J^2$, a spur gear J' secured to the countershaft $J^2$, and in mesh with the spur gear K secured to the countershaft $K^2$, a spur gear K' also secured to the shaft $K^2$ and the spur gear L' in mesh with the gear K' and secured to the screw shaft L. As shown, the countershafts $J^2$ and $K^2$, as well as the screw shaft L are all parallel to the driven shaft B and are all journaled in the housing C. C' represents lubricant receptacles for the various bearings. Mounted on the threaded portion of the shaft L, in the form of the apparatus shown, are two nuts M and MA which are prevented from rotating with, and are thereby axially displaced by the rotation of, the screw shaft L, by means of trunnion extensions M' from the nuts which are received in guide-ways $C^2$ formed in the housing C and extending parallel to the length of the shaft L. On a predetermined extent of angular movement of the driven shaft B away from its neutral position, the left hand nut M engages the forked upper end O' of a lever O and moves the latter to the left. The lever O which has its lower end pivotally connected at $O^2$ to the housing C is pivotally connected between its ends to the trunnions P' of a frame or collar P loosely received in the circumferential slot $E^3$ formed in the member E. The movement thus imparted to the lever O moves the member E against the tension of its spring H, out of frictional engagement with the gear member D. The lever OA operatively connected to the member EA as the lever O is connected to the member E is engaged by the right hand traveling nut MA and thereby caused to move the member EA out of frictional engagement with the gear member D when the angular movement of the driven shaft B away from a neutral position reaches a predetermined maximum.

The power transmitting mechanism shown was primarily devised for use as a part of the scale relieving gear disclosed in my copending application, Serial No. 80,584, filed of even date herewith. It is obviously adapted for use, however, in many different relations. In the operation of the apparatus the driving and driven shafts are normally connected in practically as positive a manner as they would be if the gear member D were directly connected to the shaft B. The driven shaft then responds instantly and positively to any rotative movement of the driving shaft in either direction. When, however, the maximum permitted angular movement of the driving shaft away from a neutral position in either direction is reached, the driven shaft is disconnected from the driving shaft so far as further movement of the driven shaft in the same direction is concerned, and a failure to stop the motor at the end of the desired movement of the driven shaft is consequently without injurious consequences. Whenever the direction of the driving shaft is reversed, however, the driven shaft is in position to respond instantly and positively to the reversed rotation of the driving shaft. The provision of the two separate nuts M and MA makes it possible to adjust the permitted movement in either direction away from the neutral position which the driven shaft may have before being automatically disconnected from the driving shaft. When such capacity for adjustment is not required the two nuts M and MA may be replaced by a single suitably shaped nut.

While in accordance with the provisions of the statutes I have illustrated and described the best form of my invention now known to me, it will be obvious to those skilled in the art that changes may be made in the form of the apparatus disclosed without departing from the spirit of the invention set forth in the annexed claims.

Having now described my invention, what I claim as new and desire to secure by Letters Patent, is:

1. A power transmitting mechanism comprising in combination a driven shaft, a reversible driving member journaled on the driven shaft, a ratchet mechanism and a releasable clutch connecting said shaft and member and operating in the normal condition of said clutch to turn the shaft with said member on a rotation of the latter in one direction, and a second ratchet mechanism and releasable clutch connecting said shaft and member and operating in the normal condition of the last mentioned clutch to turn the shaft with said member on a direction of rotation of the latter opposite to the first mentioned direction of rotation.

2. A power transmitting mechanism comprising in combination a driven shaft, a reversible driving member journaled on the driven shaft, a ratchet mechanism and a releasable clutch connecting said shaft and member and operating in the normal condition of said clutch to turn the shaft with said member on a rotation of the latter in one direction, and a second ratchet mechanism and releasable clutch connecting said shaft and member and operating in the normal condition of the last mentioned clutch to turn the shaft with said member on a direction of rotation of the latter opposite to the first mentioned direction of rotation, and clutch releasing means responsive to the angular movement of said shaft for restricting the angular movement of said shaft in either direction.

3. In a power transmitting mechanism the combination of a driven shaft, a member revolubly mounted thereon, a pair of friction clutch members mounted on said shaft and movable into and out of operative engagement with said member, and a ratchet connection between each of said clutch members and said driven shaft, one of said ratchet mechanisms preventing relative movement of the corresponding clutch member and shaft in one direction and the other ratchet mechanism preventing relative movement in the opposite direction between the second clutch member and the shaft.

4. In a power transmission the combination of a driven shaft and a driving member revolubly mounted thereon, collar members splined on the shaft at opposite sides of said driving member, a pair of friction clutch members, one mounted on each collar member and movable axially therewith to engage and disengage the driving member, and a ratchet connection between each collar member and the corresponding clutch member, said ratchet connections being oppositely directed so that one prevents relative rotation in one direction and the other relative rotation in the opposite direction between the corresponding collar and friction clutch members.

5. In a power transmission the combination with the driven shaft of a driving member revolubly mounted thereon, a pair of collar members splined on said shaft one on each side of said driving shaft, a pair of friction clutch members one mounted on one and the other mounted on the second of said collar members, resilient means normally holding said clutch members in engagement with said driving member, a ratchet connection between each clutch member and corresponding collar member, said ratchet connections being oppositely connected so that one prevents relative rotation in one direction and the other prevents relative rotation in the opposite direction between the collar and clutch members connected by it, and means responsive to the angular movement of the driven shaft and operating after a predetermined movement of the shaft in either direction to disengage the driving member and the clutch member by which the driven shaft is turned in the last mentioned direction.

6. A power transmitting mechanism comprising in combination a driven shaft, a reversible driving member journaled on the driven shaft, a ratchet mechanism and a releasable clutch connecting said shaft and member and operating in the normal condition of said shaft and clutch to turn the shaft with said member on a rotation of the latter in one direction, a second ratchet mechanism and releasable clutch connecting said shaft and member and operating in the normal condition of the last mentioned clutch to turn the shaft with said member on a direction of rotation of the latter opposite to the first mentioned direction of rotation, and means geared to said driven shaft for releasing the proper clutch to prevent further movement in the same direction of the driven shaft after a predetermined movement of the latter away from a neutral position.

7. A power transmitting mechanism comprising in combination a driven shaft, a reversible driving member journaled on the driven shaft, a ratchet mechanism and a releasable clutch connecting said shaft and member and operating in the normal condition of said clutch to turn the shaft with said member on a rotation of the latter in one direction, a second ratchet mechanism and releasable clutch connecting said shaft and member and operating in the normal condition of the last mentioned clutch to turn the shaft with said member on a direction of rotation of the latter opposite to the first mentioned direction of rotation, a screw shaft geared to rotate with said driven shaft and means in threaded engagement with said shaft for releasing the proper clutch to prevent further movement in the same direction of the driven shaft after a predetermined movement of the latter away from a neutral position.

8. A power transmitting mechanism comprising in combination a driven shaft, a reversible driving member journaled on the driven shaft, a ratchet mechanism and a releasable clutch connecting said shaft and member and operating in the normal condition of said clutch to turn the shaft with said member on a rotation of the latter in one direction, a second ratchet mechanism and releasable clutch connecting said shaft and member and operating in the normal condition of the last mentioned clutch to turn the shaft with said member on a direction of rotation of the latter opposite to the first mentioned direction of rotation, a screw shaft geared to rotate with said driven shaft, a pair of nuts mounted on said screw shaft and held against rotation with respect thereto and means actuated by one of said nuts when given a predetermined axial movement in one direction for releasing the clutch through which such motion is effected, and means actuated by the other of said nuts on a predetermined axial movement thereof in the opposite direction for releasing the other clutch.

9. A power transmitting mechanism comprising in combination a driven shaft, a reversible driving member journaled on said shaft, a pair of collar members splined on the shaft at opposite sides of said driving member, a pair of friction clutch members one mounted on each of said collar members, said driving member and clutch members being formed with coöperating friction clutch surfaces, each of said collar members and the clutch member mounted thereon having coöperating provisions for preventing axial movement of either relative to the other, a ratchet connection between each collar member and the corresponding clutch member, said ratchet connections being oppositely directed so that one prevents relative rotation in one direction and the other relative rotation in the opposite direction between the corresponding collar and friction clutch members, yielding means normally holding each clutch member in operative engagement with said driving member and means for moving the clutch members out of engagement with said driving member.

WILLIAM H. GRINDALL.

Copies of this patent may be obtained for five cents each, by addressing the "Commissioner of Patents, Washington, D. C."